United States Patent
Hakoda et al.

(10) Patent No.: US 7,244,379 B2
(45) Date of Patent: Jul. 17, 2007

(54) MOLD PROTECTION METHOD FOR MOLD CLAMPING APPARATUS

(75) Inventors: Takashi Hakoda, Nagano-ken (JP); Masahiko Miyajima, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 0 days.

(21) Appl. No.: 11/017,744

(22) Filed: Dec. 22, 2004

(65) Prior Publication Data

US 2005/0151288 A1    Jul. 14, 2005

(30) Foreign Application Priority Data

Dec. 25, 2003  (JP)  ............................ 2003-428885
Oct. 5, 2004   (JP)  ............................ 2004-292272

(51) Int. Cl.
  B29C 45/64   (2006.01)
  B29C 45/80   (2006.01)
(52) U.S. Cl. ................. 264/40.1; 264/40.5; 264/328.1; 425/138; 425/150; 425/589; 425/593
(58) Field of Classification Search ............... 264/40.1, 264/40.5, 328.1; 425/137, 138, 150, 589, 425/595, 154, 593
See application file for complete search history.

(56) References Cited

U.S. PATENT DOCUMENTS 5,180,530 A * 1/1993 Cropper et al. ............ 264/40.5
5,425,905 A * 6/1995 Herbst ....................... 264/40.5
5,440,213 A * 8/1995 Arita et al. ............ 318/568.11
5,800,750 A * 9/1998 Laing et al. ................ 264/40.5
5,861,118 A * 1/1999 Hokino et al. ............. 264/40.1
6,409,495 B1 * 6/2002 Kamiguchi et al. ......... 425/150
2004/0067276 A1 * 4/2004 Watanabe ................... 425/595

FOREIGN PATENT DOCUMENTS

JP       62-32020 A    2/1987
JP       6-61806 B2    8/1994

* cited by examiner

*Primary Examiner*—Jill L. Heitbrink
(74) *Attorney, Agent, or Firm*—Birch, Stewart, Kolasch & Birch, LLP

(57) ABSTRACT

In a mold protection method for a mold clamping apparatus, a predetermined mold protection zone is set in a zone in which a mold is closed, and an anomaly such as presence of a foreign object is detected on the basis of a change in a physical quantity in the mold protection zone so as to protect the mold. The method includes the steps of previously setting, as a reference position, a closed position of a movable platen at which a target mold clamping force is obtained; setting an end position of the mold protection zone with respect to the reference position; obtaining, during a production operation, an actual closed position (detected position) of the movable platen; and correcting the end position of the mold protection zone on the basis of a deviation between the detected position and the reference position.

14 Claims, 9 Drawing Sheets

MOLD PROTECTION METHOD FOR MOLD CLAMPING APPARATUS

BACKGROUND OF THE INVENTION

1. Field of the Invention

The present invention relates to a mold protection method for a mold clamping apparatus, which method detects an anomaly such as presence of a foreign object on the basis of a change in a physical quantity in a mold protection zone.

2. Description of the Related Art

A conventional toggle-type mold clamping apparatus for clamping a mold of an injection molding machine is disclosed in, for example, Japanese Patent Publication (kokoku) No. 6(1994)-61806. As disclosed in this publication, a toggle-type mold clamping apparatus includes a toggle mechanism which connects a movable platen for supporting a movable mold half and a crosshead advanced and retracted by a drive unit, and has a function of transmitting pressing force of the crosshead to the movable platen while amplifying the force. In such a mold clamping apparatus, when the toggle mechanism is completely extended, a predetermined mold clamping force determined on the basis of an extension of tie bars is generated. As shown in FIG. 10, in a mold clamping operation, high-speed mold closing is typically performed from a mold open position Xa, and the operation mode is switched to low speed, low pressure mold closing at a predetermined low speed, low pressure changeover position Xb. The period during which the low speed, low pressure mold closing is performed serves as a mold protection zone, during which a molded product not having been properly ejected or the like is detected as a foreign object. When a predetermined high-pressure changeover position Xc is reached, the operation mode is switched to high-pressure mold clamping so as to clamp the mold under high pressure. In FIG. 10, Xd shows a mold clamping end position. Load torque T of a drive motor for driving the mold clamping apparatus changes as shown in FIG. 10 during the mold clamping operation.

Incidentally, unlike a direct-pressure-application-type mold clamping apparatus, because of its operation principle, a toggle-type mold clamping apparatus has a drawback in that slight expansion or contraction of a mold and tie bars, stemming from disturbing factors such as heating temperature of the mold and ambient temperature, causes a considerable change in mold clamping force, which results in deterioration in quality, in particular at the time of molding of precision products. FIG. 11 shows a change in mold clamping force Fm with time for the case where the correct value (target value) of mold clamping force Fm is 400 kN. As is apparent from FIG. 11, during a period in which the mold temperature elevates, the mold clamping force Fm increases from 400 kN to 500 kN because of thermal expansion of the mold. After completion of the temperature elevation, since heat is transferred from the mold to the tie bars, the tie bars expand, whereby the mold clamping force Fm gradually decreases. Notably, thermal expansion of the mold is a factor which increases the mold clamping force Fm, and thermal expansion of the tie bars is a factor which decreases the mold clamping force Fm.

As described above, in a toggle-type mold clamping apparatus, disturbing factors such as heating temperature of a mold and ambient temperature are influential factors which must be taken into consideration so as to accurately maintain the mold clamping force Fm. Japanese Patent Application Laid-Open (kokai) No. 62(1987)-32020 discloses a mold clamping force control method which can cope with such disturbing factors. In the disclosed method, the thickness of a mold or a mold clamping force during a molding operation is detected by means of mold-thickness detection means consisting of an optical or magnetic scale supported on a stationary mold plate and a position detector disposed on a movable mold plate, and a correction value determined from the detected thickness and its target value is fed back to mold-thickness adjustment means, whereby mold clamping force is maintained constant.

Meanwhile, in the above-described toggle-type mold clamping apparatus, in general, a predetermined mold protection zone is set in a mold closing zone, and an anomaly such as presence of a foreign object is detected on the basis of a change in a physical quantity in the mold protection zone so as to protect a mold. In such a case the foreign object is mainly a molded product not having been ejected during mold opening and remaining within the mold.

Incidentally, in some cases, sheet-shaped products having a thickness of about 0.1 mm are molded. Due to its light weight, such a molded product is likely to adhere to the inner surface of the mold by means of static electricity. Accordingly, in order to detect a molded product of such a kind, the end position of the mold protection zone must be set to be located rearward, by at least 0.1 mm, of the closed point of the mold. In addition, in the case where the closed point of the mold is detected on the basis of change in a physical quantity, the end position of the mold protection zone must be set to be located rearward of the closed point in order to avoid interference between detection of a foreign object and detection of the closed point.

However, even in the case where the end position of the mold protection zone is accurately set so as to meet the above-described requirements, when the above-described thermal expansion of a mold and that of tie bars occur upon an increase in temperature of the mold, the closed point of the mold shifts forward or rearward, whereby detection of an anomaly such as presence of a foreign object becomes impossible or erroneous detection occurs, under a certain condition that a thin product is molded and the closed point of the mold is detected on the basis of change in a physical quantity.

SUMMARY OF THE INVENTION

An object of the present invention is to provide a mold protection method for a mold clamping apparatus, which method can avoid the problems of impossibility of detection of an anomaly such as present of a foreign object or erroneous detection, even under a condition that a thin product is molded and the closed point of a mold is detected on the basis of change in a physical quantity.

Another object of the present invention is to provide a mold protection method for a mold clamping apparatus, which method can accurately detect a closed position of a movable platen, and eliminates the necessity for mold-thickness detection means, such as a scale and a position detector, for directly detecting the thickness of a mold, to thereby lower cost through reduction in the number of parts, and prevent the structure around a mold from becoming complex.

To achieve the above objects, the present invention provides a mold protection method for a mold clamping apparatus, in which a predetermined mold protection zone is set in a mold closing zone, and an anomaly such as presence of a foreign object is detected on the basis of a change in a physical quantity in the mold protection zone so as to protect a mold, the method comprising the steps of: previously setting, as a reference position (reference value), a closed position of a movable platen at which a target mold clamping force is obtained; setting an end position of the mold protection zone with respect to the reference position; detecting, during a production operation, an actual closed position (detected position or detection value) of the movable platen; and correcting the end position of the mold protection zone on the basis of a deviation between the detected position and the reference position.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the structure of a toggle-type mold clamping apparatus Mc to which a mold protection method according to the present embodiment can be applied will be described with reference to FIGS. 7 and 8.

Figure 7:
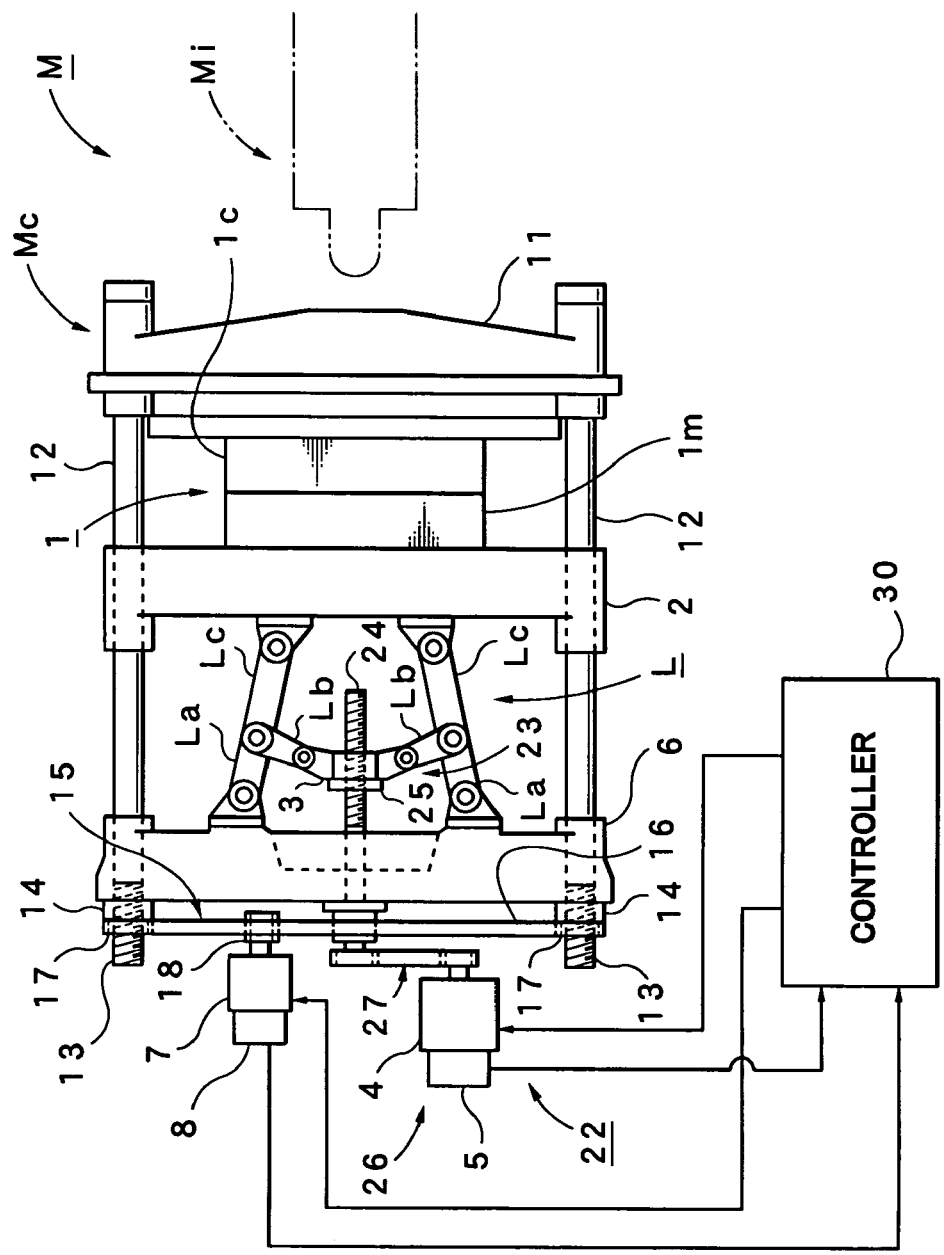
FIG. 7 is a view showing the structure of a toggle-type mold clamping apparatus for which the mold protection method is performed.

FIG. 7 shows an injection molding machine M including a toggle-link-type mold clamping apparatus Mc and an injection apparatus Mi. The mold clamping apparatus Mc includes a stationary platen 11 and a pressure-receiving platen 6 which are separated from each other. The stationary platen 11 is fixedly mounted on an unillustrated machine base, and the pressure-receiving platen 6 is mounted on the machine base in such a manner that it can advance and retract. Four tie bars 12 extend between the stationary platen 11 and the pressure-receiving platen 6. Front ends of the tie bars 12 are fixed to the stationary platen 11, and rear ends of the tie bars 12 pass through the pressure-receiving platen 6. Adjustment nuts 14, which also serve as stoppers for the pressure-receiving platen 6, are in screw-engagement with male threads 13 formed at the rear ends of the tie bars 12.

The adjustment nuts 14 constitute a mold-thickness adjustment mechanism for adjusting the position of the pressure-receiving platen 6. This mold-thickness adjustment mechanism includes an adjustment drive mechanism section for rotating the adjustment nuts 14. The adjustment drive mechanism section includes a drive motor 7 for moving the pressure-receiving platen; a rotary encoder 8 attached to the drive motor 7 so as to detect rotation of the drive motor 7; and a transmission mechanism 15 for simultaneously transmitting rotation of the drive motor 7 to the adjustment nuts 14. For such transmission, the transmission mechanism 15 includes a timing belt 16 wound around the four adjustment nuts 14 and a drive gear 18 attached to a shaft of the drive motor 7 in such a manner that the timing belt 16 engages gear portions 17 of the adjustment nuts 14 and the drive gear 18.

By virtue of this configuration, when the drive motor 7 is operated, rotation of the drive gear 18 is transmitted to the gear portions 17 of the adjustment nuts 14 via the timing belt 16, whereby the adjustment nuts 14 rotate, and advance or retract along the male thread portions 13 of the tie bars 12. As a result, the pressure-receiving platen 6 advances or retracts, whereby the position of the pressure-receiving platen 6 in the forward/backward direction can be adjusted. Notably, although the embodiment exemplifies the transmission mechanism 15 utilizing the timing belt 16, all rotation transmission may be performed by means of gears without use of the timing belt 16.

Meanwhile, a movable platen 2 is mounted slidably on the tie bars 12. The movable platen 2 supports a movable mold half 1m, and the stationary platen 11 supports a stationary mold half 1c. The movable mold half 1m and the stationary mold half 1c constitute a mold 1. A toggle link mechanism L is disposed between the pressure-receiving platen 6 and the movable platen 2. The toggle link mechanism L includes a pair of first links La coupled to the pressure-receiving platen 6; a pair of output links Lc coupled to the movable platen 2; and a pair of second links Lb coupled to connecting rods which connect the first links La and the output links Lc. A crosshead 3 is coupled to the second links Lb.

Moreover, a mold-clamping drive section 22 is disposed between the pressure-receiving platen 6 and the crosshead 3. The mold clamping drive section 22 includes a ball screw mechanism 23, which consists of a ball screw 24 rotatably supported on the pressure-receiving platen 6 and a ball nut 25 in screw-engagement with the ball screw 24 and fixed to the crosshead 3; and a rotation drive mechanism section 26 for rotating the ball screw 24. The rotation drive mechanism section 26 includes a servomotor 4 for mold clamping; a rotary encoder 5 attached to the servomotor 4 so as to detect rotation of the servomotor 4; and a rotation transmission section 27 for transmitting rotation of the servomotor 4 to the ball screw 24. The rotation transmission section 27 includes a driven gear attached to the ball screw 24, a drive gear attached to a shaft of the servomotor 4, and a timing belt wound around the drive gear and the driven gear.

By virtue of this configuration, when the servomotor 4 is operated, rotation of the servomotor 4 is transmitted to the ball screw 24 via the rotation transmission section 27, whereby the ball screw 24 rotates, and thus, the ball nut 25 advances or retracts. As a result, the crosshead 3, with which the ball nut 25 is integrated, advances or retracts, and the toggle link mechanism L is contracted or expanded, whereby the movable platen 2 moves in a mold opening direction (retracting direction) or in a mold closing direction (advancing direction). Reference numeral 30 denotes a controller, to which the servomotor 4 for mold clamping, the rotary encoder 5, the drive motor 7 for moving the pressure-receiving platen, and the rotary encoder 8 are connected.

Figure 8:
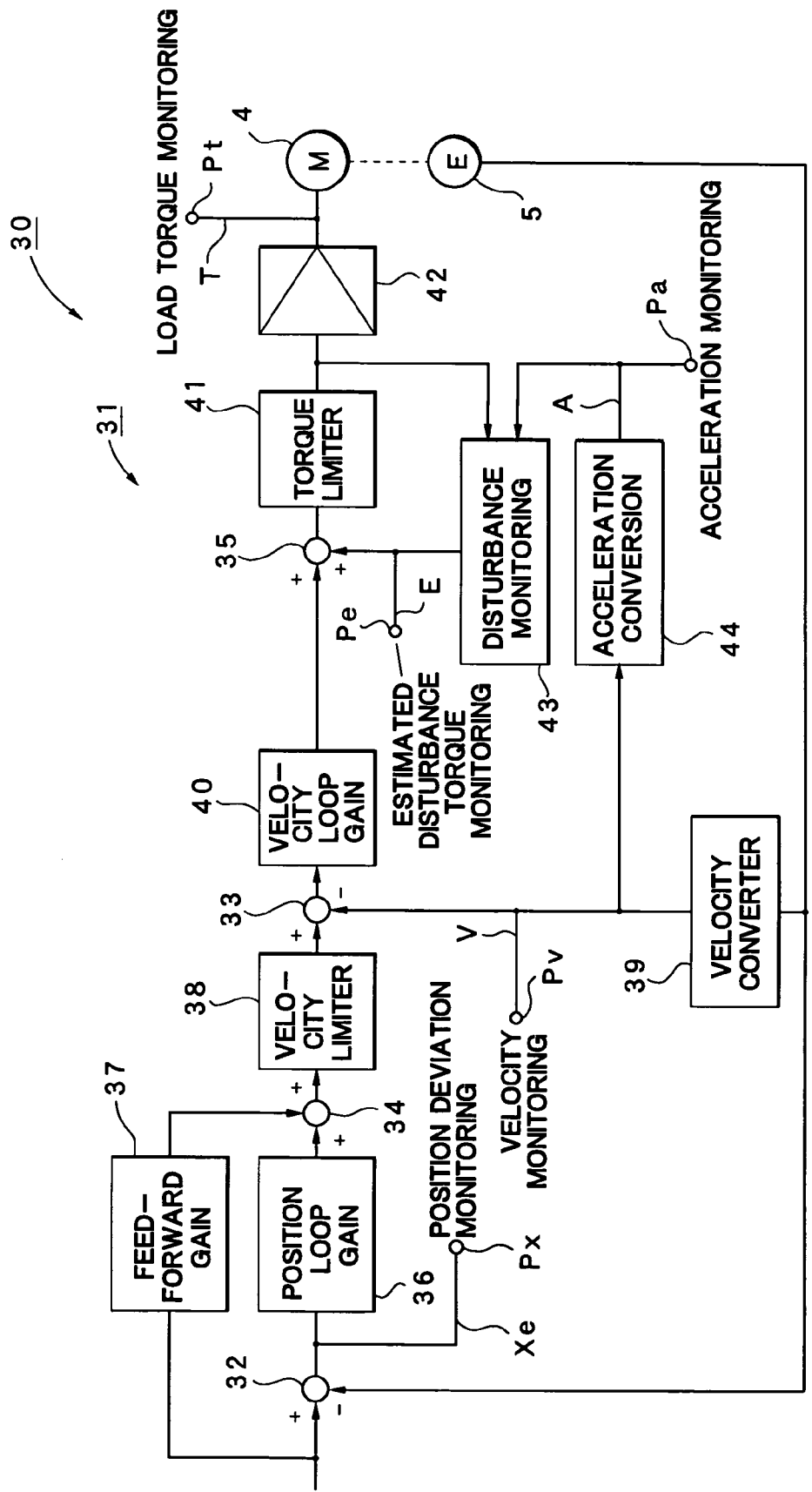
FIG. 8 is a block circuit diagram showing a portion of a controller provided for the toggle-type mold clamping apparatus.

FIG. 8 shows a servo circuit 31, which is a portion of the controller 30. The servo circuit 31 includes deviation calculation sections 32 and 33; adders 34 and 35; a positional-loop-gain setting section 36; a feed-forward-gain setting unit 37; a velocity limiter 38, a velocity converter (differentiator) 39; a velocity-loop-gain setting section 40; a torque limiter 41; a driver 42; a disturbance monitoring section 43; and an acceleration converter (differentiator) 44. Thus, the system shown in FIG. 8 constitutes a servo control system (servo circuit 31). The above-mentioned servomotor 4 for mold clamping is connected to the output side of the driver 42, and the rotary encoder 5 attached to the servomotor 4 is connected to the inverted input sections of the velocity converter 39 and the deviation calculation section 32. The non-inverted input section of the deviation calculation section 32 is connected to an unillustrated sequence controller.

In FIG. 8, Pt denotes a signal output terminal used for detection of load torque T generated at the time of closure of the mold 1; Pv denotes a signal output terminal used for detection of velocity V of the movable platen 2 at the time of closure of the mold 1; Pa denotes a signal output terminal used for detection of acceleration A of the movable platen 2 at the time of closure of the mold 1; Pe denotes a signal output terminal used for detection of estimated torque E generated by disturbances at the time of closure of the mold 1; and Px denotes a signal output terminal used for detection of position deviation X of the movable platen 2 at the time of closure of the mold 1. Notably, operations (functions) of the respective sections will be described in the following description of overall operation of the mold clamping apparatus Mc.

Next, a mold protection method according to the present embodiment, along with operation (function) of the toggle-type mold clamping apparatus Mc, will be described with reference to FIGS. 1 to 8.

The controller 30 has a closed position detection mode. In the closed position detection mode, the controller 30 detects a closed point Cs of the mold 1 on the basis of a change in a physical quantity at the time of closure of the mold 1, detects the position of the crosshead 3 of the toggle mechanism L at the time of detection of the closed point Cs, and, from the detected position of the crosshead 3, obtains the position (closed position) of the movable platen 2 at the closed point Cs.

Load torque T is a preferable physical quantity which changes at the time of closure of the mold 1. A signal indicative of the load torque T is obtained from the signal output terminal Pt. The signal obtained from the signal output terminal Pt is fed to the controller 30. Meanwhile, a threshold Ts for the load torque T is set in the controller 30 (see FIG. 5). The threshold Ts is used for detecting the closed point Cs of the mold 1; i.e., an increase in the load torque T stemming from contact between the movable mold half 1m and the stationary mold half 1c. The threshold Ts can be set to an arbitrary level, and if necessary, can be set through trial mold clamping performed a predetermined number of times.

First, initial setting is performed by use of this closed position detection mode. The processing steps for this closed position detection mode during initial setting will now be described in accordance with the flowchart shown in FIG. 2. The mold 1 is assumed to be presently located at a mold open position (full open position). Therefore, the crosshead 3 of the toggle mechanism L is located at a mold open position Xa shown in FIG. 5. Upon start of mold clamping operation, the servomotor 4 is operated, so that the movable platen 2 advances from the mold open position in a mold closing direction. At this time, high-speed mold closing, in which the movable platen 2 advances at high speed, is first performed.

In this case, the servo circuit 31 performs velocity control and position control for the movable platen 2 (crosshead 3). That is, a position instruction value is fed from the sequence controller to the deviation calculation section 32 of the servo circuit 31, and is compared with the position detection value obtained on the basis of encoder pulses from the rotary encoder 5. As a result, a position deviation Xe is output from the deviation calculation section 32, and feedback control for position is performed on the basis of the position deviation Xe.

The position deviation Xe is amplified by means of the positional-loop-gain setting section 36 and fed to an input section of the adder 34. Moreover, the position instruction value is amplified by means of the feed-forward-gain setting section 37 and fed to another input section of the adder 34. An output of the adder 34 is fed to a non-inverted input section of the deviation calculation section 33 via the velocity limiter 38. Meanwhile, the position detection value is differentiated by means of the velocity converter 39 to thereby be converted to a velocity (velocity detection value) V, which is fed to an inverted input section of the deviation calculation section 33. As a result, a velocity deviation is output from the deviation calculation section 33, and feedback control for velocity is performed on the basis of the velocity deviation. Notably, the velocity V is limited by means of the velocity limiter 38.

The velocity deviation is amplified by means of the velocity-loop-gain setting section 40 and fed to an input section of the adder 35. Meanwhile, the velocity V is differentiated by means of the acceleration converter 44 to thereby be converted to an acceleration (acceleration detection value) A, which is fed to an input section of the disturbance monitoring section 43. The disturbance monitoring section 43 monitors the acceleration A. When the acceleration A anomalously changes because of a certain cause (disturbance), the disturbance monitoring section 43 outputs an estimated torque (torque value) E for accelerating return to the normal. This estimated torque E is fed to an input section of the adder 35 as a correction value. As a result, a torque instruction (instruction value) is output from the adder 35 and fed to the driver 42 via the torque limiter 41. With this, the servomotor 4 is driven and controlled, whereby position control and velocity control for the movable platen 2 (crosshead 3) are performed. Notably, the torque instruction output from the torque limiter 41 is fed back to an input section of the disturbance monitoring section 43.

Meanwhile, the crosshead 3 reaches a preset low speed, low pressure changeover point Xb as a result of advancement of the movable platen 2 in the mold closing direction, and operation for low speed, low pressure mold closing is started (steps S11). After start of the low speed, low pressure mold closing operation, monitoring for detecting the closed point Cs of the mold 1 is performed (step S12). When the load torque T reaches a preset threshold Ts for closed point detection, the present point is detected as the closed point Cs of the mold 1, and the position of the crosshead 3 at that time is detected (steps S13 and S14). Since the detection of the closed point Cs of the mold 1 and the detection of position of the crosshead 3 are performed simultaneously, the closed position corresponding to the closed point Cs can be accurately obtained even though the closed position of the movable platen 2 is obtained on the basis of the position of the crosshead 3. The position of the crosshead 3 is detected by use of encoder pulses output from the rotary encoder 5, which detects rotation of the servomotor 4 for mold clamping. In the present embodiment, the rotary encoder 5 is an incremental encoder; and the absolute position of the crosshead 3 is detected on the basis of the number of generated encoder pulses counted from the reference position. Use of such a rotary encoder 5 eliminates the necessity for separate position detection means for detecting the position of the crosshead 3.

The closed position of the movable platen 2 is calculated on the basis of the position of the crosshead 3 (step S15). Since a known conversion formula is provided for conversion between the position of the crosshead 3 and the position of the movable platen 2, the closed position of the movable platen 2 is calculated by use of the conversion formula. The thus-obtained closed position is set (stored) as a reference value Ds (step S16). The above is the description of an unit operation in the closed position detection mode. As will be described later, an actual reference value Ds (and a detection value Dd) can be obtained from the average of a plurality of closed positions which are obtained through performance of the operation for the closed position detection mode a plurality of times.

Meanwhile, once the reference value Ds is obtained, the end position Xe of a mold protection zone is set with respect to the reference value Ds (step S17). In this case, the end position Xe is set in consideration of, in particular, the thickness of a product to be molded. For example, in the case where the product to be molded has a thickness of J mm, the end position Xe is set within a range of J-mm rearward from the closed point Cs of the mold 1. With this setting, a molded product not having been ejected during mold opening and remaining within the mold 1 can be reliably detected as a foreign object, and detection of a foreign object and detection of the closed point Cs can be performed in a stable and reliable manner without occurrence of interference therebetween.

Figure 6:
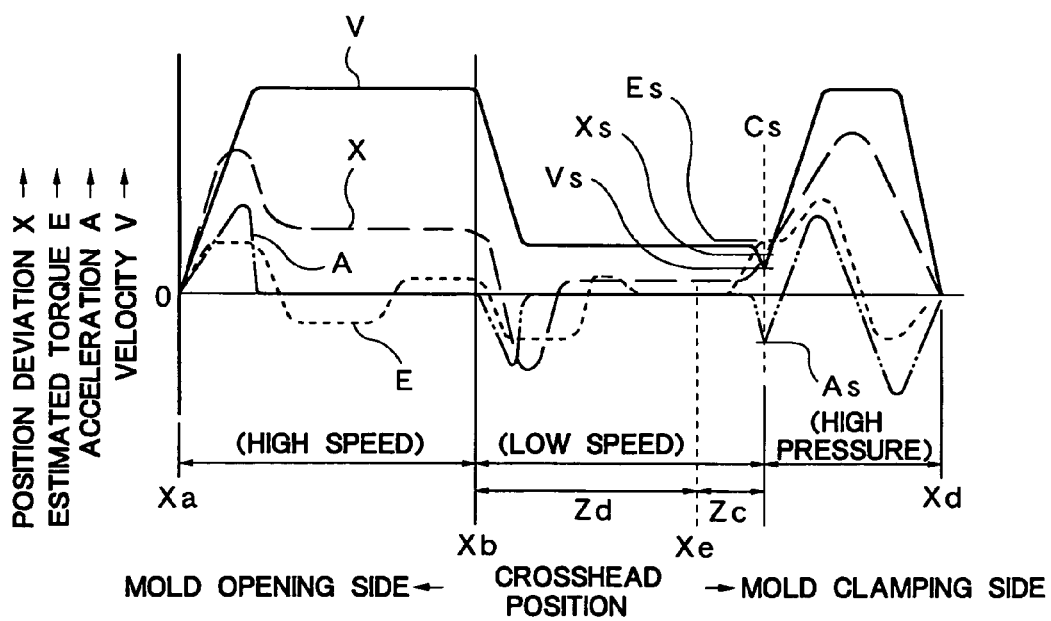
FIG. 6 is a graph used for explaining the mold protection method, the graph showing changes in various physical quantities with position of the crosshead.

The above-described detection of the closed point Cs utilizes an increase in the load torque T stemming from the closure of the mold 1; i.e., an increase in the load torque T stemming from contact between the movable mold half 1m and the stationary mold half 1c. However, physical quantities which change upon closure of the mold 1, other than the load torque T, are present. Examples of such physical quantities include velocity V of the crosshead 3 at the time of closure of the mold 1, acceleration A of the crosshead 3 at the time of closure of the mold 1, estimated torque E generated because of disturbance at the time of closure of the mold 1, and positional deviation X of the crosshead 3 at the time of closure of the mold 1. FIG. 6 shows changing profiles of these physical quantities. Like the case where the closed point Cs of the mold 1 is detected on the basis of the load torque T, the closed point Cs of the mold 1 can be detected on the basis of these physical quantities. Specifically, a threshold Vs (As, Es, Xs) is set for velocity V (acceleration A, estimated torque E, positional deviation X), and the closed point Cs of the mold 1 is detected on the basis of the fact that the velocity V (acceleration A, estimated torque E, positional deviation X) has reached the threshold Vs (As, Es, Xs). In this case, a signal indicative of the velocity V, acceleration A, estimated torque E, or positional deviation X can be obtained from the signal output terminal Pv, Pa, Pe, or Px. Notably, these physical quantities may be used singly or in combination. Combined use of these physical quantities enhances reliability.

Next, operation during production will be described with reference to the flowchart shown in FIG. 1. Production operation is assumed to be presently performed in an automatic molding mode (step S1). In this case, the above-described reference value Ds has already been set. During production operation, when a preset time for detection of closed position or a preset number of shots for detection of closed position is reached, operation for the closed position detection mode is automatically performed (steps S2 and S3). The intervals at which operation for the closed position detection mode is performed may be set in consideration of the degree of change in the mold clamping force Fm in an actual machine; e.g., the operation for the closed position detection mode may be performed for every shot, or every time a predetermined number of shots are performed or a predetermined period of time elapses.

Figure 3:
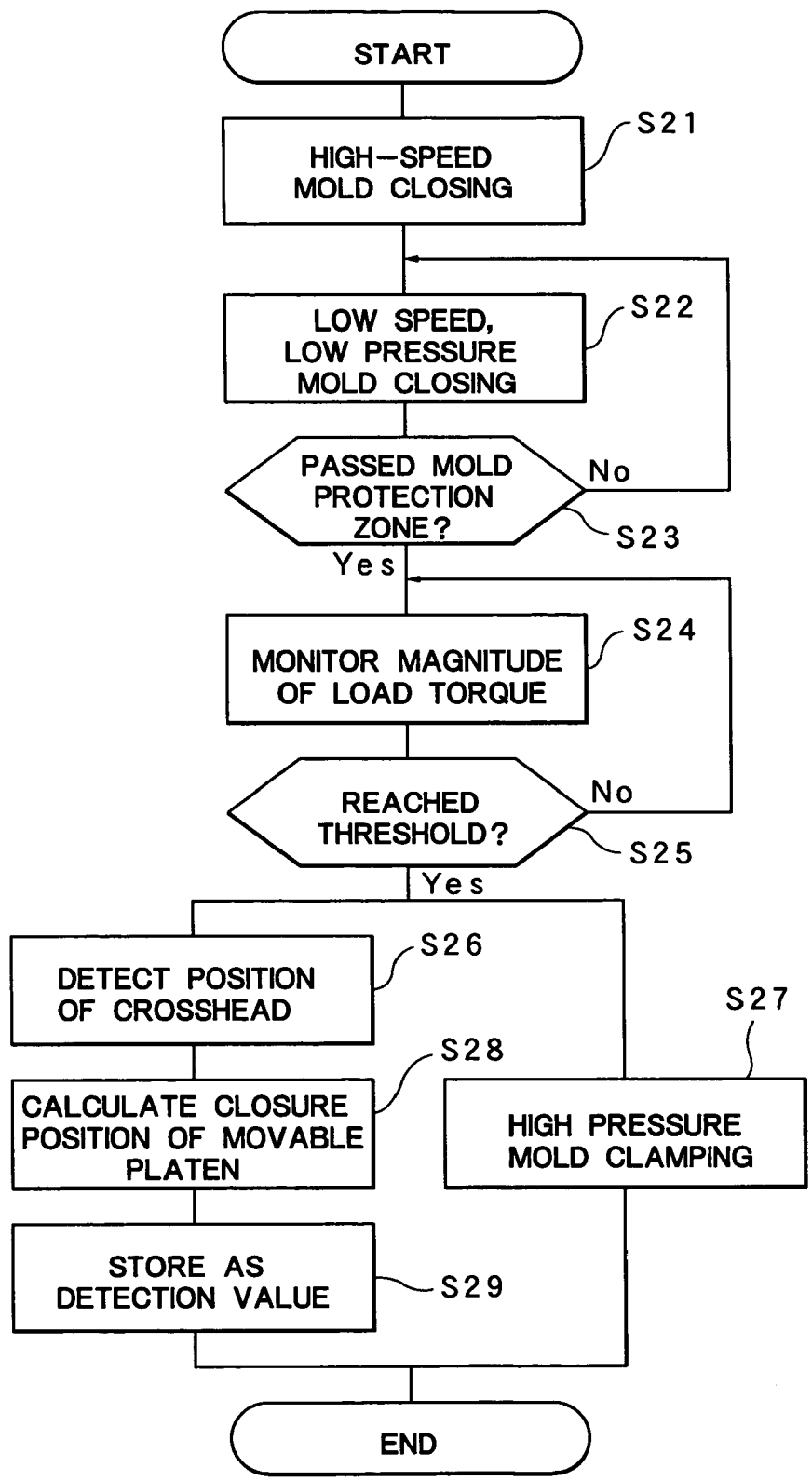
FIG. 3 is a flowchart showing processing steps of the mold protection method for operation in the closed position detection mode performed during production operation.
Figure 5:
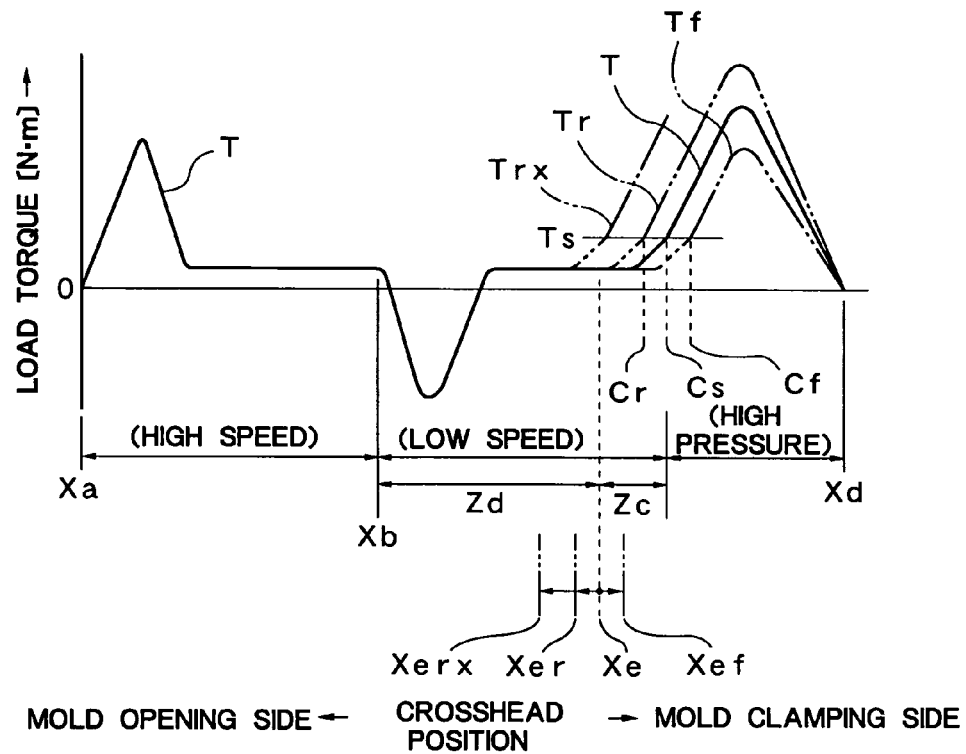
FIG. 5 is a graph used for explaining the mold protection method, the graph showing change in load torque with position of a crosshead.

The processing steps for this closed position detection mode during production operation will now be described in accordance with the flowchart shown in FIG. 3. The mold 1 is assumed to be presently located at the mold open position (full open position). Therefore, the crosshead 3 of the toggle mechanism L is located at the mold open position Xa shown in FIG. 5. Upon start of mold clamping operation, the servomotor 4 is operated, so that the movable platen 2 advances from the mold open position in a mold closing direction. At this time, high-speed mold closing, in which the movable platen 2 advances at high speed, is first performed (step S21). Meanwhile, the crosshead 3 reaches the preset low speed, low pressure changeover point Xb as a result of advancement of the movable platen 2 in the mold closing direction, and operation for low speed, low pressure mold closing is started (step S22). As shown in FIG. 5, the operation for low speed, low pressure mold closing is performed in a mold protection zone Zd and a closed point detection zone Zc. Specifically, processing (foreign object detection processing) for detecting presence of a foreign object is performed in the foreign object detection zone Zd, and processing for detecting the closed point Cs of the mold 1 is performed in the closed point detection zone Zc. That is, in the mold protection zone Zd, the magnitude of the load torque T is monitored. When the magnitude of the load torque T exceeds a preset threshold, a foreign object is determined to be present, and processing for anomaly such as mold opening control is performed. By virtue of this processing, breakage or the like of the mold 1 is prevented, whereby the mold 1 is protected.

When the closed point detection zone Zc is reached after passage of the mold protection zone Zd, monitoring for detecting the closed point Cs of the mold 1 is performed (steps S23 and S24). When the load torque T reaches a preset threshold Ts for closed point detection, the present point is detected as the closed point Cs of the mold 1. Upon detection of the closed point, high-pressure mold claming is started, and the position of the crosshead 3 at that time is detected (steps S25, S26, and S27). As described above, the mold protection zone Zd is set in a first half of the low speed, low pressure mold closing zone, and the closed point detection zone Zc is set in a second half of the low speed, low pressure mold closing zone; i.e., following the mold protection zone Zd. Therefore, both the processing for detection of a foreign object and the processing for detecting the closed point Cs of the present invention can be performed in a stable and reliable manner without occurrence of interference therebetween. Notably, the closed point detection zone Zc shifts forward or rearward in accordance with the detection timing of the closed point Cs.

Moreover, the closed position of the movable platen 2 is calculated on the basis of the position of the crosshead 3 (step S28). As described above, since a known conversion formula is provided for conversion between the position of the crosshead 3 and the position of the movable platen 2, the closed position of the movable platen 2 is calculated by use of the conversion formula. The thus-obtained closed position is fed to the controller 30 as a detection value Dd (step S29).

Figure 1:
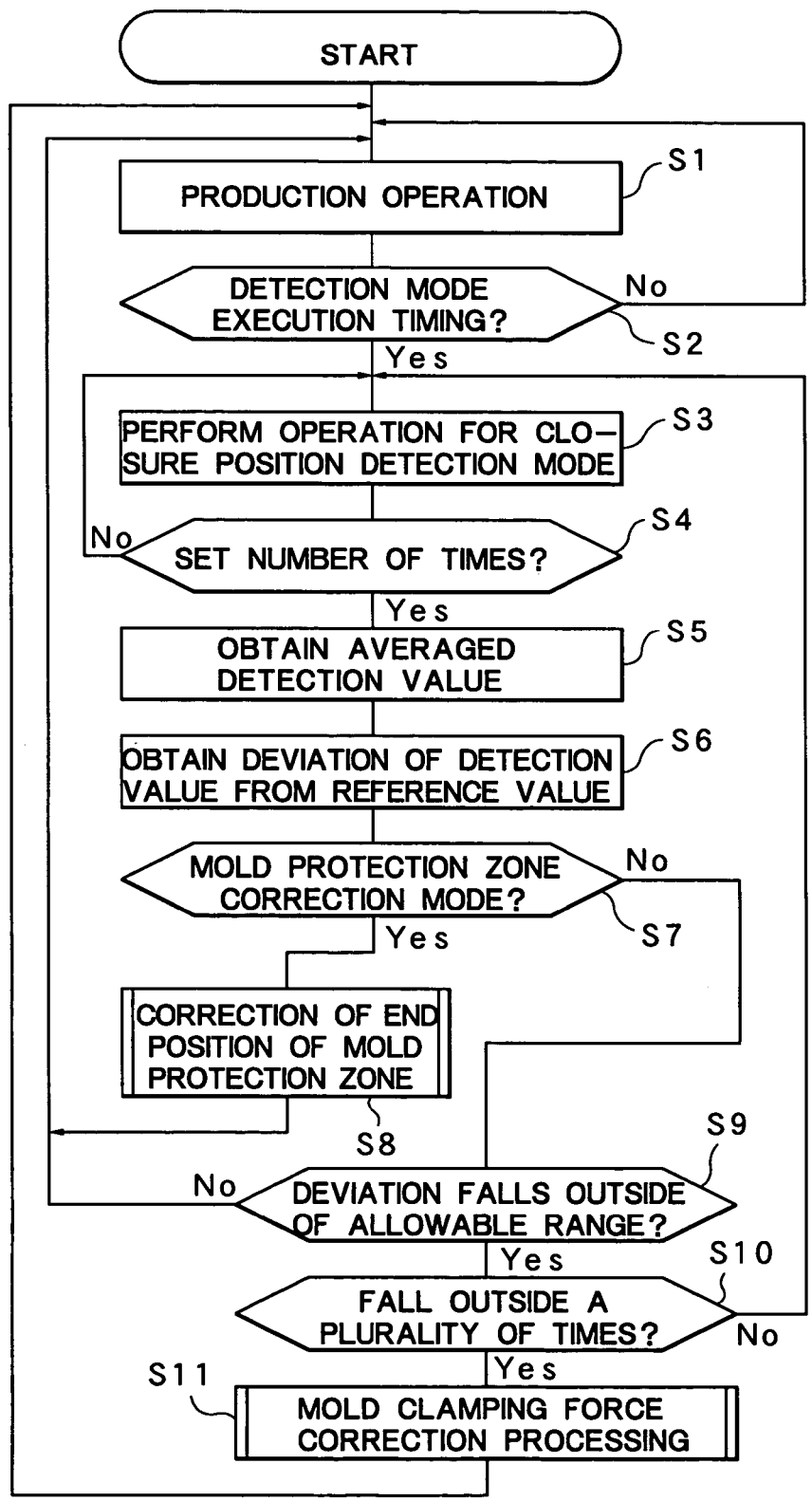
FIG. 1 is a flowchart showing the overall processing steps of a mold protection method according to an embodiment of the present invention.
Figure 2:
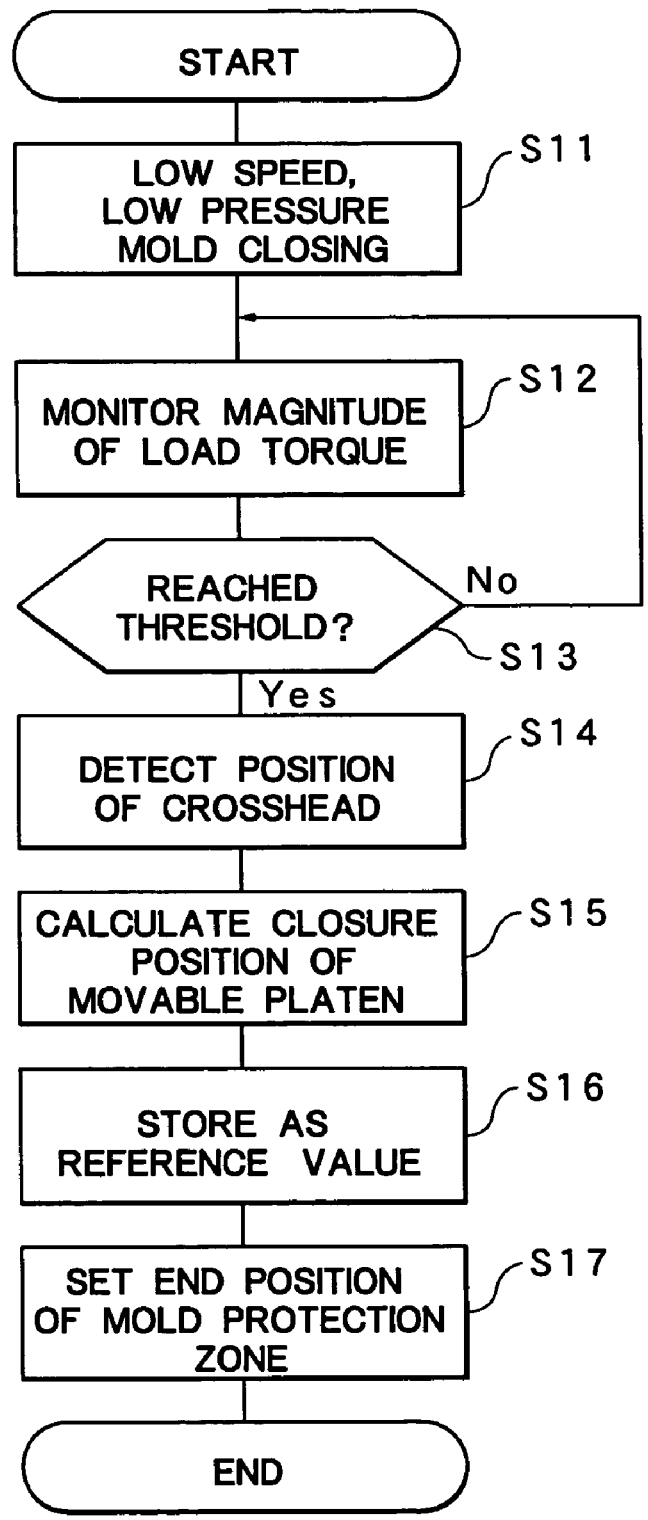
FIG. 2 is a flowchart showing processing steps of the mold protection method for operation in a closed position detection mode performed during initial setting.

In the present embodiment, as shown in FIG. 1, the operation for the closed position detection mode is performed a plurality of times (preset number of times), and the detection value Dd is obtained from the average of a plurality of closed positions thus obtained (steps S4 and S5). This operation enables obtainment of a reliable detection value Dd, from which noise components have been removed. Once the detection value Dd is obtained, a deviation Ke of the detection value Dd from the preset reference value Ds; i.e., Ke=Ds−Dd, is obtained (S6).

The controller 30 has a mold clamping force correction mode and a mold protection zone correction mode. A user can freely choose the mold clamping force correction mode or the mold protection zone correction mode in advance. Here, the mold protection zone correction mode is assumed to have been selected in advance. In this case, the previously set end position Xe of the mold protection zone Zd is corrected on the basis of the deviation Ke (steps S7 and S8). The correction of the end position Xe of the mold protection zone Zd is performed as follows. In FIG. 5, load torque variation profiles Tf and Tr indicated by imaginary lines each show the case where the mold clamping force Fm has changed. The load torque variation profile Tr is a variation profile for the case where the mold 1 is heated and thermally expanded, and the load torque reaches the threshold Ts at a closed point Cr prior to the correct closed point Cs. In such a case, the mold clamping force Fm increases. Accordingly, when the mold open position is considered to be the start point (0) of distance, the end position Xe is shifted rearward by an amount corresponding to the deviation Ke so that the end position Xe is corrected to move to Xer shown in FIG. 5. In FIG. 5, reference character Zc represents a closed point detection zone between the end position Xe and the closed point Cs. However, when the closed point Cs shifts, the end position Xe is corrected so that the closed point detection zone Zc has a constant distance at all times. This correction processing is performed automatically, and such automatic correction enables timely and quick correction processing.

In particular, the load torque variation profile Trx shown in FIG. 5 is a variation profile for the case where the mold 1 is heated further, and the movable mold half 1m starts to come into contact with the stationary mold half 1c before the end position Xe. In this case, if the end position Xe were not corrected, it would become difficult to determine whether variation in the load torque Tr has occurred because of contact between the movable mold half 1m and the stationary mold half 1c during a normal operation, or because of presence of a foreign object, resulting in an erroneous detection operation. In contrast, in the present invention, since the end position Xe is corrected to move to Xerx, as described above, both the processing for detection of a foreign object and the processing for detecting the closed point Cs of the present invention can be performed in a stable and reliable manner without occurrence of interference therebetween.

Similarly, the load torque variation profile Tf is a variation profile for the case where the tie bars 12 are heated and thermally expanded, and the load torque reaches the threshold Ts at a closed point Cf after the correct closed point Cs. In such a case, the mold clamping force Fm decreases. Accordingly, the end position Xe is shifted forward by an amount corresponding to the deviation Ke so that the end position Xe is corrected to move to Xef shown in FIG. 5. The above-described operation for the closed position detection mode can accurately detect such closed points Cs, Cf, and Cr, which relate to variation in the mold clamping force Fm. The above is correction processing in the mold protection zone correction mode.

Next, the case where the mold camping force correction mode has been selected is considered. When the mold clamping force correction mode has been selected, processing for correcting the mold clamping force Fm is first performed (steps S7, S9, etc.). In this case, since an allowable range Re in relation to the deviation Ke has been previously set in the controller 30, the allowable range Re is compared with the deviation Ke so as to determine whether the deviation Ke falls outside the allowable range Re. When the deviation Ke falls within the allowable range Re, correction for the mold clamping force Fm is not performed. Accordingly, the production operation is continued under the same conditions (steps S9 and S1).

When the deviation Ke falls outside the allowable range Re, the detection value Dd is obtained again (steps S9, S10, and S3). That is, in the present embodiment, the detection value Dd is continuously obtained a plurality of times; and when the deviation Ke successively falls outside the allowable range Re a plurality of times, correction for the mold clamping force Fm is performed (step S11). For example, correction for the mold clamping force Fm is performed when two detection values Dd are successively detected and two deviations Ke obtained therefrom fall outside the allowable range Re. Accordingly, in the case where the deviation Ke falls outside the allowable range Re only one time, the deviation Ke is determined to have been produced by a temporary factor such as disturbance, and correction is not performed. This operation enhances the stability and reliability of correction. Notably, processing for the closed position detection mode or correction processing is performed, and the automatic molding (production operation) is temporarily stopped, and resumed after completion of the processing for the closed position detection mode or the correction processing. Alternatively, the correction processing may be performed at a predetermined timing; e.g., during a period other than a high pressure mold clamping period, such as a mold opening period, an ejection period, or an intermediate period.

Figure 4:
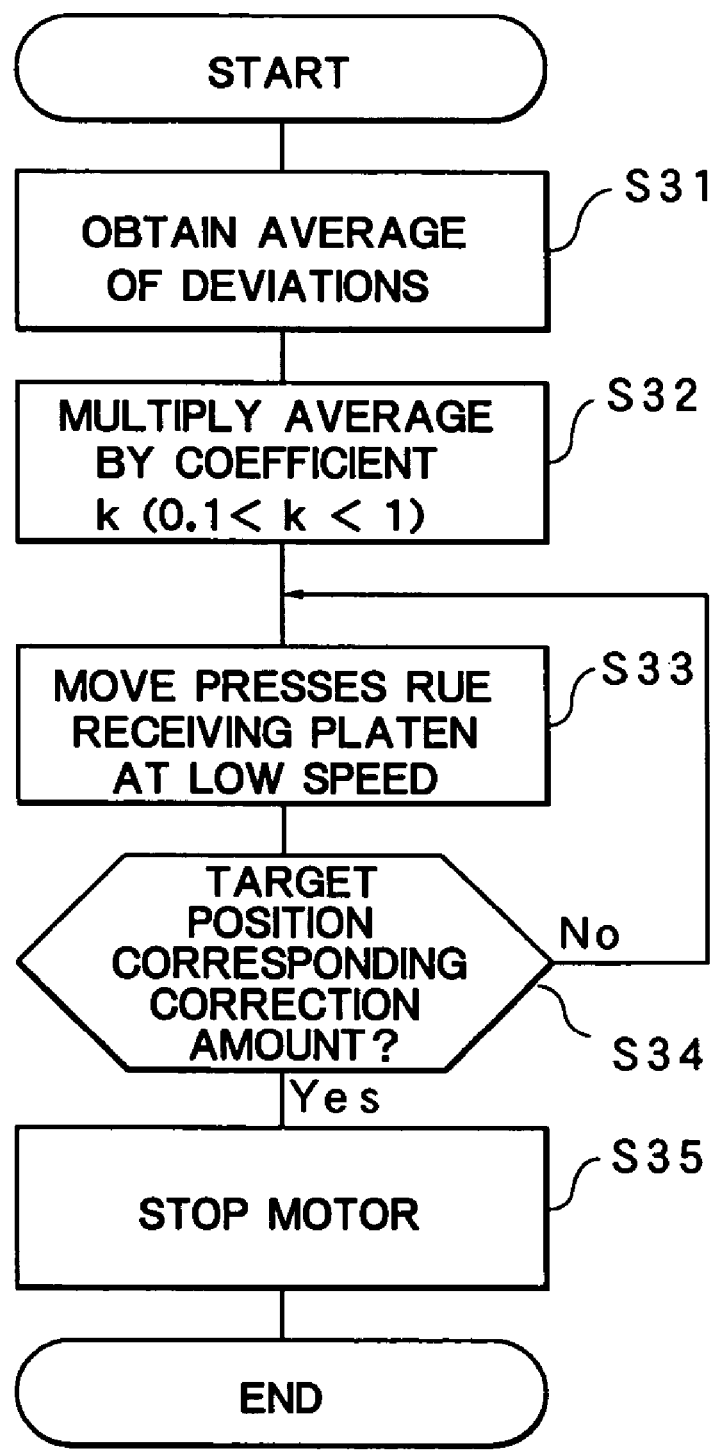
FIG. 4 is a flowchart showing processing steps of the mold protection method for correcting mold clamping force.

Next, the processing steps for correction of mold clamping force Fm will be described in accordance with the flowchart of FIG. 4.

Since in the present embodiment correction is performed when the deviation Ke falls outside the allowable range Re a plurality of times (e.g., two times), a plurality of the deviations Ke are obtained. Accordingly, in the present embodiment, the deviations Ke are averaged so as to obtain a mean value (step S31). Notably, in the case where a plurality of deviations are detected, their mean value or latest value may be used.

Incidentally, since the deviation Ke is a deviation of the position of the movable platen 2, the deviation Ke can be cancelled out through performance of correction in which the pressure-receiving platen 6 is moved by an amount corresponding to the deviation Ke. However, when the deviation Ke is used as a correction value as is, hunting may occur, and correction may become unstable. Therefore, the deviation Ke is multiplied by a coefficient k less than 1 (typically, 0.1<k<1) so as to obtain a correction amount Ks smaller than the original deviation Ke, and correction is performed by use of the correction amount Ks (=Ke·k) (step S32).

When correction is performed, the drive motor 7 for moving the pressure-receiving platen is driven and controlled on the basis of the correction amount Ks so as to move the pressure-receiving platen 6 in a direction for reducing the deviation Ke (step S33). In this case, the pressure-receiving platen 6 is moved at speed lower than the ordinary speed. The position of the pressure-receiving platen 6 is detected by use of encoder pulses output from the rotary encoder 8 attached to the drive motor 7, and feedback control for position is performed. The rotary encoder 8 is an incremental encoder; and the absolute position is detected on the basis of the number of generated encoder pulses counted from the reference position. When the pressure-receiving platen 6 has been moved to a target position corresponding to the correction amount Ks, the drive motor 7 is stopped (steps S34 and S35).

The above-described correction processing is performed automatically. This automatic correction enables timely and quick correction. Such automatic correction may be performed by making use of an existing automatic mold clamping force setting function (automatic mold thickness adjustment function) of the toggle-type mold clamping apparatus Mc. The automatic mold clamping force setting function is used, for example, at the time of mold exchange so as to set a target value of mold clamping force in an initial stage, to thereby automatically set the mold clamping force. When such an existing automatic mold clamping force setting function is utilized, in general, more accurate correction can be performed, although processing time required for correction tends to increase.

Moreover, when the processing of correcting the mold clamping force Fm in the mold clamping force correction mode is performed, after completion of the correction of the mold clamping force Fm, correction processing for automatically correcting the end position Xe of the mold protection zone Zd on the basis of the deviation Ke is executed. That is, correction processing similar to the above-described processing in the mold protection zone correction mode (step S8) is performed. With this operation, by making use of the deviation Ke between the detection value Dd and the reference value Ds, correction of the mold clamping force Fm and correction of the end position Xe of the mold protection zone Zd can be performed simultaneously, whereby more ideal correction can be performed.

Notably, in the above-described mold protection zone correction mode, the end position Xe is corrected immediately after the deviation Ke between the detection value Dd and the reference value Ds is obtained. However, the correction may be performed on the basis of the deviation Ke which is obtained in the same procedure as that in the mold clamping force correction mode. Specifically, as in the case of correction of the mold clamping force Fm in the mold clamping force correction mode, when the deviation Ke falls outside a predetermined allowable range, the detection value Dd is obtained again. The detection value Dd is continuously obtained a plurality of times; and when the deviation Ke successively falls outside the allowable range a plurality of times, correction for the mold clamping force Fm is performed. Accordingly, when the deviation Ke falls within the allowable range, correction of the end position Xe is not performed, and when the deviation Ke falls outside the allowable range only one time, the deviation Ke is determined to have been produced by a temporary factor such as disturbance, and correction is not performed. Meanwhile, in the correction of the mold clamping force Fm in the mold clamping force correction mode, the correction through the same procedure as that in the mold protection zone correction mode may be employed; i.e., the mold clamping force Fm may be corrected immediately after the deviation Ke between the detection value Dd and the reference value Ds is obtained.

Meanwhile, instead of automatic correction, manual correction may be performed by an operator. In the case of manual correction, the allowable range Re for the deviation Ke is previously set, and when the deviation Ke falls outside the allowable range Re, this is reported by means of a warning. On the basis of this, the operator manually performs correction. In this case, correction can be performed on the basis of the operator's experience and know-how, and depending on the type of products to be molded, the operator may continue production without performance of correction. Therefore, production operation (automatic molding) is continued under the same conditions until the operator performs a certain operation for correction. Such manual correction and automatic correction may be used solely or in combination.

Incidentally, in the above-described embodiment, the closed position of the movable platen 2 is described to be the closed position of the movable platen 2 itself. However, the term "closed position" encompasses not only the closed position of the movable platen 2 itself, but also a position that indirectly represents the closed position of the movable platen 2. That is, a position of the crosshead 3 or the like corresponding to a predetermined closed position of the movable platen 2 may be used as the closed position of the movable platen 2. When the particular position of the crosshead 3 is used as the closed position, the processing of converting position of the crosshead 3 to position of the movable platen 2 (in the above-described step S15) becomes unnecessary, whereby the processing steps for the closed position detection mode can be simplified.

Figure 9:
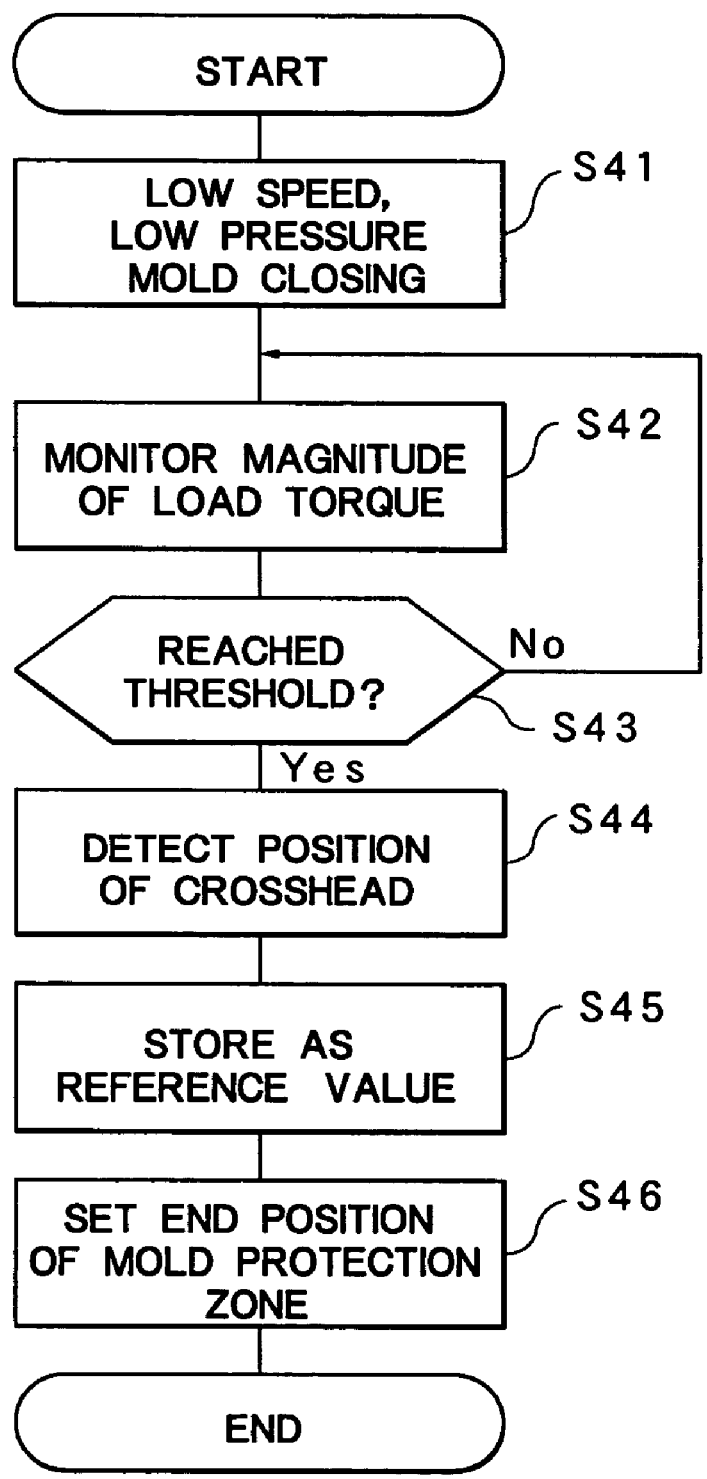
FIG. 9 is a flowchart showing processing steps of the mold protection method for operation in another closed position detection mode performed during initial setting.
Figure 10:
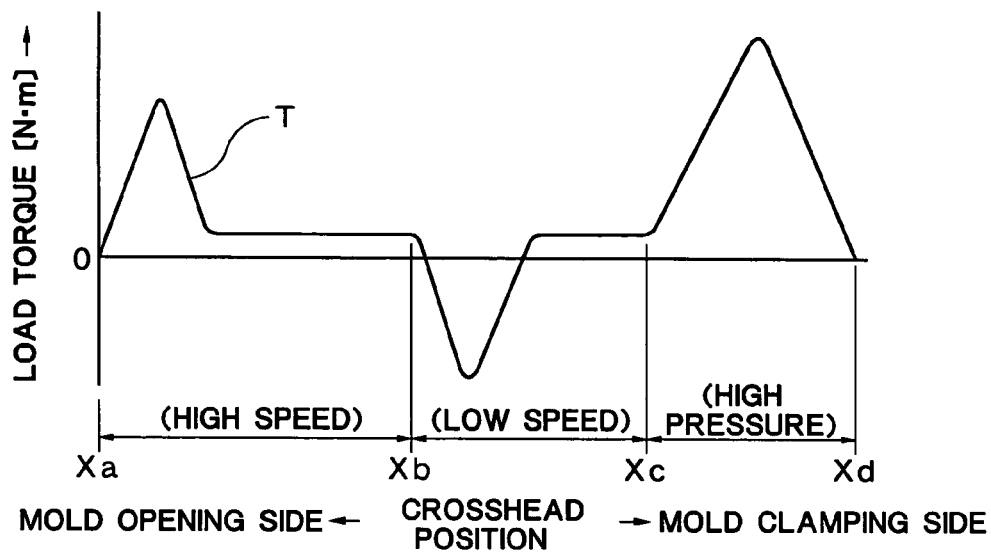
FIG. 10 is a graph used for explaining a conventional technique, the graph showing change in load torque with position of a crosshead.
Figure 11:
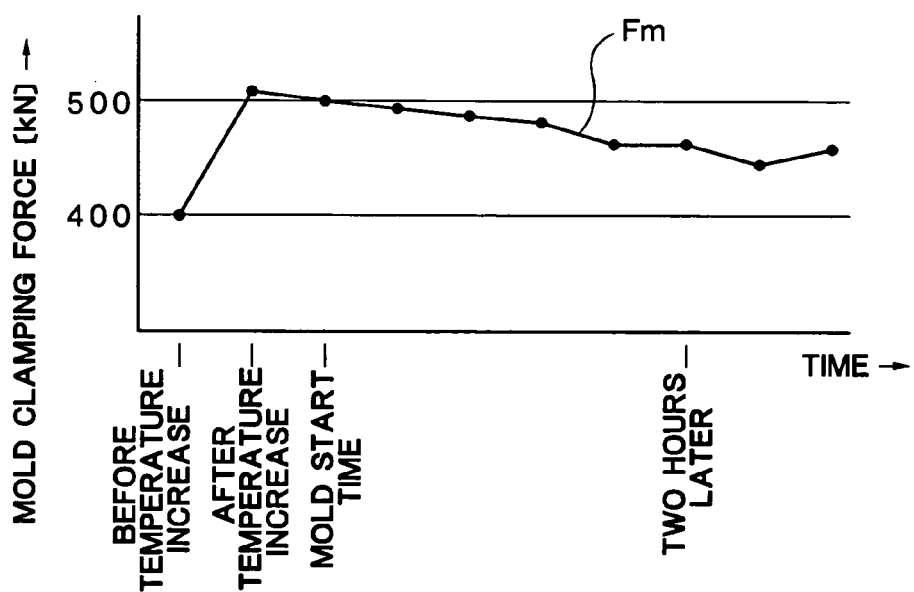
FIG. 11 is a graph used for explaining a conventional technique, the graph showing change in mold clamping force with time.

FIG. 9 shows the processing steps for the closed position detection mode (during initial setting) for the case where the particular position of the crosshead 3 is used as the closed position. The processing steps for the closed position detection mode will be now described with reference to the flowchart of FIG. 9.

Here, the mold 1 is assumed to be presently located at a mold open position (full open position). Therefore, the crosshead 3 of the toggle mechanism L is located at the mold open position Xa shown in FIG. 5. Upon start of mold clamping operation, the servomotor 4 is operated, so that the movable platen 2 advances from the mold open position in a mold closing direction. At this time, high-speed mold closing, in which the movable platen 2 advances at high speed, is first performed. Meanwhile, the crosshead 3 reaches a preset low speed, low pressure changeover point Xb as a result of advancement of the movable platen 2 in the mold closing direction, and operation for low speed, low pressure mold closing is started (steps S41). After start of the low speed, low pressure mold closing operation, monitoring for detecting the closed point Cs of the mold 1 is performed (step S42). When the load torque T reaches a preset threshold Ts for closed point detection, the present point is detected as the closed point Cs of the mold 1, and the position of the crosshead 3 at that time is detected (steps S43 and S44). The detection of the crosshead 3 can be performed by use of encoder pulses output from the rotary encoder 5, which detects rotation of the servomotor 4 for mold clamping.

The thus-obtained position of the crosshead 3 is set (stored) as a reference value Ds of the closed position of the movable platen 2 (step S45). An actual reference value Ds (and a detection value Dd) can be obtained from the average of a plurality of closed positions which are obtained through performance of the operation for the closed position detection mode a plurality of times. After the reference value Ds is obtained, the end position Xe of the mold protection zone is set with respect to the reference value Ds (step S46). Notably, the above-described processing is identical with that for the closed position detection mode having been described with reference to FIG. 2, except that a position of the crosshead 3 is set as the reference value Ds of the closed position of the movable platen 2, and that the calculation processing of converting position of the crosshead 3 to the closed position of the movable platen 2 is not performed.

Meanwhile, during production operation, actual position of the crosshead 3 is detected and is used as the detection value Dd. As a result, the deviation Ke of the detection value Dd from the reference value Ds set in step S45 can be obtained, and the end position Ke of the mold protection zone Zd can be corrected on the basis of the deviation Ke. Accordingly, in this case as well, the present invention can be practiced as in the same manner as in the case where the position of the movable platen 2 is directly used as the closed position.

In the mold protection method for the mold clamping apparatus Mc according to the present embodiment, the closed position (reference value Ds) of the movable platen 2 at which a target mold clamping force Fm is obtained, and an actual closed position (detection value Dd) are obtained, and the end position Ke of the mold protection zone Zd is corrected on the basis of the deviation Ke between the detection value Dd and the reference value Ds. Therefore, the method of the present invention can solve the problems of impossibility of detection of an anomaly such as presence of a foreign object or erroneous detection, even under a condition that a thin product is molded and the closed point of the mold 1 is detected on the basis of change in a physical quantity.

While the present invention has been described with reference to the preferred embodiment, the present invention is not limited thereto. Regarding the details of the method and structure, numerical values, among others, modifications and omission or addition may be possible as needed without departing from the scope of the invention. For example, anomaly stemming from a foreign object or the like may encompass not only anomaly stemming from a remaining molded product, but also other types of anomalies such as failure or partial breakage of the mold 1 or other components. In the above-described embodiment, output (for torque monitoring) of the driver 42 is utilized to detect the load torque T. However, torque instruction serving as an input of the torque limiter 41 may be used.

What is claimed is:

1. A mold protection method for a mold clamping apparatus, in which a predetermined mold protection zone is set in a mold closing zone, and presence of a foreign object is detected as an anomaly on the basis of a change a physical quantity in the mold protection zone so as to protect a mold, the method comprising the steps of:

moving a crosshead in a mold closing direction at a first speed until reaching a crossover point;

moving the crosshead at a second speed less than the first speed until a preset threshold is reached, the preset threshold being a threshold for change that has been set in advance in each of the physical quantity, and the closure of the mold being detected on the basis of detection of the change in the physical quantity having reached the preset threshold;

outputting an estimated torque (E) based on detection of an anomalous change in acceleration (A) of the crosshead at a time of closure of the mold;

previously setting, as a reference position, a closed position of a movable platen at which a target mold clamping force is obtained;

setting an end position of the mold protection zone with respect to the reference position;

detecting, during a production operation, an actual closed position of the movable platen; and correcting the end position of the mold protection zone on the basis of a deviation between the detected position and the reference position, wherein the physical quantity includes the estimated torque (E) based on the detection of the anomalous change in the acceleration (A) of the crosshead, the anomalous change in the acceleration (A) being detected when the change in the acceleration (A) reaches the preset threshold.

2. A mold protection method for a mold clamping apparatus according to claim 1, wherein the physical quantity includes a load torque (L) at the time of closure of the mold.

3. A mold protection method for a mold clamping apparatus according to claim 1, wherein the physical quantity includes the second speed of the crosshead at the time of closure of the mold.

4. A mold clamping force correction method for a toggle-type mold clamping apparatus according to claim 1, wherein the physical quantity includes the acceleration (A) of the crosshead at the time of closure of the mold.

5. A mold protection method for a mold clamping apparatus according to claim 1, wherein the physical quantity includes a position deviation (X) of the crosshead at the time of closure of the mold.

6. A mold protection method for a mold clamping apparatus according to claim 1, wherein the mold clamping apparatus has a toggle mechanism, and has a closed position detection mode in which closure of the mold is detected on the basis of a change in the physical quantity because of closure of the mold, a position of the crosshead of the toggle mechanism is detected at the time of detection of the closure of the mold, and a closed position of the movable platen at the time of the closure of the mold is obtained from the detected position of the crosshead.

7. A mold protection method for a mold clamping apparatus according to claim 6, wherein operation in the closed position detection mode is performed a plurality of times, and the detected position is obtained from the average of a plurality of obtained closed positions.

8. A mold protection method for a mold clamping apparatus according to claim 6, wherein the mold is closed at the second speed until the closure is detected, and is clamped under high pressure after detection of the closure.

9. A mold protection method for a mold clamping apparatus according to claim 8, wherein when the mold is closed at the second speed, foreign object is detected in a foreign object detection zone, and the closure of the mold is detected in a closed point detection zone subsequent to the foreign object detection zone.

10. A mold protection method for a mold clamping apparatus according to claim 1, wherein the position of the crosshead is detected by use of encoder pulses output from a rotary encoder which detects rotation of a servomotor for mold clamping.

11. A mold protection method for a mold clamping apparatus according to claim 1, wherein the physical quantity an estimated torque (E) generated by a disturbance at the time of closure of the mold.

12. A mold protection method for a mold clamping apparatus according to claim 1,
wherein the physical quantity is a combination of at least two physical quantities, including an estimated torque (E) generated by a disturbance at the time of closure of the mold, and an acceleration (A) of the crosshead at the time of closure of the mold, and
wherein the preset threshold is a threshold based on a change in the estimated torque (E) and the anomalous change in the acceleration (A).

13. A mold protection method for a mold clamping apparatus, in which a predetermined mold protection zone is set in a mold closing zone, and presence of a foreign object is detected as an anomaly on the basis of a change in at least two physical quantities in the mold protection zone so as to protect a mold, the method comprising the steps of:
moving a crosshead in a mold closing direction at a first speed until reaching a crossover point;
moving the crosshead at a second speed less than the first speed until a preset threshold is reached, the preset threshold being a threshold for change that has been set in advance in each of the at least two physical quantities, and the closure of the mold being detected on the basis of detection of the change in each of the at least two physical quantities having reached the preset threshold;
previously setting, as a reference position, a closed position of a movable platen at which a target mold clamping force is obtained;
setting an end position of the mold protection zone with respect to the reference position;
detecting, during a production operation, an actual closed position of the movable platen; and
correcting the end position of the mold protection zone on the basis of a deviation between the detected position and the reference position,
wherein the mold clamping apparatus has a toggle mechanism, and has a closed position detection mode in which closure of the mold is detected on the basis of a change in the at least two physical quantities because of closure of the mold, a position of the crosshead of the toggle mechanism is detected at the time of detection of the closure of the mold, and a closed position of the movable platen at the time of the closure of the mold is obtained from the detected position of the crosshead, wherein the at least two physical quantities include:
an estimated torque (E) based on detection of an anomalous change in acceleration of the crosshead at a time of closure of the mold, and
an acceleration (A) at the time of closure of the mold, the anomalous change in the acceleration (A) being detected when the change in the acceleration (A) reaches the preset threshold.

14. A mold protection method for a mold clamping apparatus, in which a predetermined mold protection zone is set in a mold closing zone, and presence of a foreign object is detected as an anomaly on the basis of a change in a least three physical quantities in the mold protection zone so as to protect a mold, the method comprising the steps of:
moving a crosshead in a mold closing direction at a first speed until reaching a crossover point;
moving the crosshead at a second speed less than the first speed until a preset threshold is reached, the preset threshold being a threshold for change that has been set in advance in each of the at least three physical quantities, and the closure of the mold being detected on the basis of detection of the change in each of the at least three physical quantities having reached the preset threshold;
previously setting, as a reference position, a closed position of a movable platen at which a target mold clamping force is obtained;
setting an end position of the mold protection zone with respect to the reference position;
detecting, during a production operation, an actual closed position of the movable platen; and
correcting the end position of the mold protection zone on the basis of a deviation between the detected position and the reference position,
wherein when the mold is closed at the second speed, foreign object is detected in a foreign object detection zone, and the closure of the mold is detected in a closed point detection zone subsequent to the foreign object detection zone, wherein the at least three physical quantities include:
an estimated torque (E) based on detection of an anomalous change in acceleration of the crosshead at a time of closure of the mold,
an acceleration (A) of the crosshead at the time of closure of the mold, the anomalous change in the acceleration (A) being detected when the change in the acceleration (A) reaches the preset threshold, and
at least one other physical quantity.

* * * * *